March 21, 1961 C. H. RICHARDSON Re. 24,952

SCRAPER CYLINDER IMPROVEMENT

Original Filed Feb. 3, 1956 2 Sheets-Sheet 1

INVENTOR
CECIL H RICHARDSON

Fetherstonhaugh & Kent.

PATENT ATTORNEYS

March 21, 1961 C. H. RICHARDSON Re. 24,952

SCRAPER CYLINDER IMPROVEMENT

Original Filed Feb. 3, 1956 2 Sheets-Sheet 2

INVENTOR

CECIL H RICHARDSON

Fetherstonhaugh & Kent.

PATENT ATTORNEYS

United States Patent Office

Re. 24,952
Reissued Mar. 21, 1961

24,952

SCRAPER CYLINDER IMPROVEMENT

Cecil H. Richardson, Saskatoon, Saskatchewan, Canada

Original No. 2,882,621, dated Apr. 21, 1959, Ser. No. 563,372, Feb. 3, 1956. Application for reissue July 1, 1960, Ser. No. 40,487

1 Claim. (Cl. 37—126)

Matter enclosed in heavy brackets [ ] appears in the original patent but forms no part of this reissue specification; matter printed in italics indicates the additions made by reissue.

My invention relates to new and useful improvements in overthrow scrapers, the principal object and essence of my invention being to provide a device of a character herewithin described in which the hydraulic cylinder is mounted for pivotal movement so that the optimum angle of attack of the piston rod with the bowl of the scraper is maintained and which furthermore provides a cantilever support for the front end of the piston rod.

Yet another object of my invention is to provide a device of a character herewithin described and which, due to the pivotal movement of the cylinder, permits a lower hydraulic pressure to be used than is normal with conventional overthrow scrapers.

A further object of my invention is to provide a device of a character herewithin described which, due to the cantilever support being supplied to the front end of the piston rod, reduces the strain within the front gland of the cylinder which is normally utilized to support the extended weight of the piston rod.

A still further object of my invention is to provide a device of a character herewithin described which is readily adapted to be fitted to existing devices with a minimum of alteration thereto.

Still another object of my invention is to provide a device of a character herewithin described, which, due to the position of the cantilever support arms for the piston rod, prevents the piston rod from turning or attempting to turn axially during extension and retraction thereby simplifying the mechanism engaging the forward end of the piston rod with the bowl track.

Yet another object of my invention is to provide a device of a character herewithin described which is simple in construction, economical in manufacture and otherwise well-suited to the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which.

In the drawings like characters of reference indicate corresponding parts in the different figures.

Conventional overthrow scrapers of the character described consist of a relatively heavy duty framework, a scraper and a bowl situated transversely across the framework and adapted to receive material such as soil engaged by the scraper elements. The bowl is pivotally connected by the lower ends thereof to the chassis and is semi-circular when viewed in side elevation and rectangular when viewed in plan and the bowl is so situated that, in conjunction with a front apron, the scraper is designed to hold as much as 10 yards of material at one time. When it is desired to unload the device, the forward apron is raised and the bowl is pivoted forwardly by means of an hydraulic cylinder and piston assembly so that the contents thereof are unloaded forwardly of the machine which incidentally is normally drawn behind a tractor or some similar means.

Due to the capacity of the bowl, and due to the situation thereof, it is necessary to have an hydraulic cylinder and piston assembly with a relatively long stroke so that it will be appreciated when the piston rod is in its foremost position, the only support for same is by means of the front gland and bearing assembly at the forward end of the cylinder. It will also be appreciated that if stones or the like jam between the forward end of the piston rod and the bowl tracks, it is quite easy to bend or distort the piston rod thus putting the device out of action.

The device hereinafter to be described, overcomes these disadvantages by providing forward support for the piston rod and at the same time providing a better angle of attack of the thrust between the piston rod and the bowl.

Figure 1:
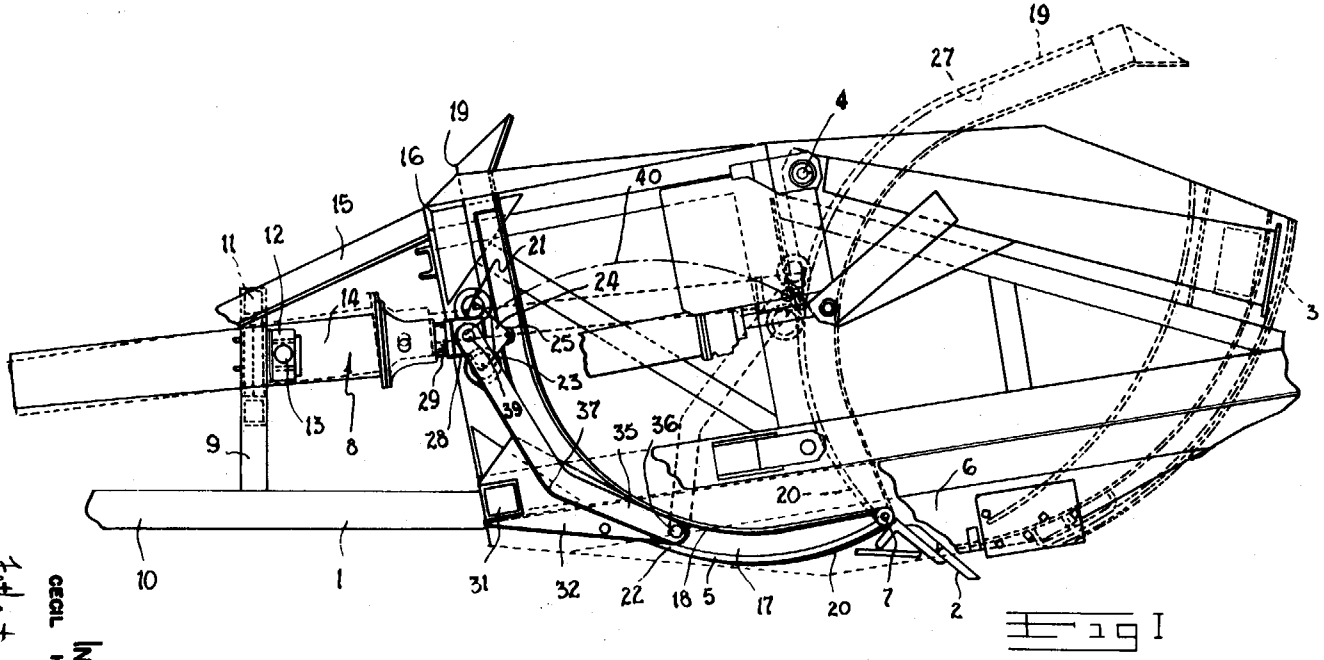
Figure 1 is a side elevation of a conventional overthrow bowl scraper showing my invention in situ.
Figure 2:
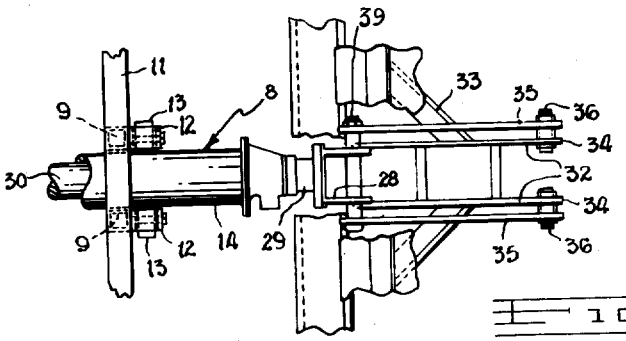
Figure 2 is a fragmentary top plan view showing the mounting of the cylinder and the mounting of the cantilever arms, the piston rod being in its rearmost position.
Figure 3:
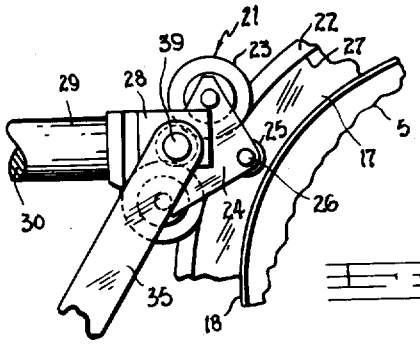
Figure 3 is an enlarged fragmentary side elevation showing the engagement of the forward end of the piston rod with the track of the overthrow bowl.

Proceeding therefore to describe my invention in detail, it will be seen upon reference to Figure 1 that I have shown a side elevation and in fragmentary form, the framework or chassis 1 of a conventional overthrow scraper including scraper elements 2 spanning the framework transversely and front apron 3 pivotally secured to the framework as at 4, it being understood that this front apron assembly may be raised or lowered by conventional hydraulic means (not illustrated).

The bowl 5 is substantially arcuate when viewed in side elevation and rectangular when viewed in plan and is situated across the framework 1 of the device, being pivoted to frame member 6 by means of pins 7 adjacent to the scraper blade assembly 2. When in the rearward position as shown in full line in Figure 1, this bowl is adapted to receive material scraped by blade 2 and when in the forward position as shown in phantom in Figure 1, it is in the position to discharge same forwardly of the device providing the forward apron 3 is raised as hereinbefore described.

The bowl is actuated by means of an hydraulic cylinder and piston assembly collectively designated 8 mounted upon vertical struts 9 as will hereinafter be described.

These vertical struts extend upwardly from the rear frame members specifically designated 10 and are spanned by a transverse bracket 11 for support purposes. Bearing blocks 12 are secured to these vertical struts 9 and are adapted to receive trunnions 13 secured to and extending from the cylinder wall 14 so that the cylinder is pivoted for limited radial movement within the bearing blocks 12 and it should be observed that these trunnions are situated upon the forward half of the cylinder 8 so that the majority of the cylinder extends rearwardly thereof. Diagonal braces 15 extend from the upper ends of struts 9 forwardly to the main superstructure 16 thus taking up the thrust of the cylinder and piston assembly 8 when actuated.

A curved track 17 is secured to the rear surface 18 of the bowl 5 centrally across the width thereof and extends from the upper extremity 19 to adjacent the lower extremity 20 and a trolley collectively designated 21 is adapted to engage this track which is provided with a transverse flange *22* [2]. Trolley 21 consists of pairs of flange wheels 23 engaging flange 22 and mounted for rotation between triangular *plates* [plate] 24. Relatively small wheels 25 are carried upon pins 26 also mounted in the triangular [plate] *plates* 24 and these wheels 25 are adapted to engage the under surface 27 of the flange 22 in order that the bowl may be pulled from the unloaded position to the loading position.

Plates 24 are mounted upon block 28 which in turn is carried upon the forward end 29 of the piston rod 30 actuated by the cylinder 8.

Figure 4:
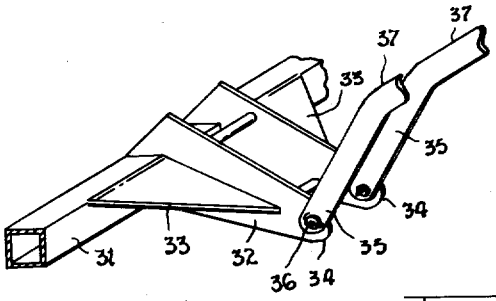
Figure 4 is a fragmentary perspective view showing the mounting of the bearer arms with the framework.

A transverse frame member 31 spans the frame members 10 rearwardly of the bowl 5 and carries a pair of support brackets 32 secured to the member 31 and extending forwardly therefrom braced by means of webs 33 as clearly shown in Figure 4. Upon the forward end 34 of these support brackets is pivotally secured bearer arms 35 by means of pins 36, said bearer arms extending upwardly and being angulated as at 37 along the length thereof and being secured by the upper ends thereof by means of pivot pins 39 to the aforementioned block 28 upon the forward end of piston rod 29.

From the foregoing it will be appreciated that when the piston rod 29 is extended, the upper ends of the bearer arms 35 will follow an arc shown by broken line 40 and which I define as being the major segment of a circle having its centre at the point of pivotal attachment of the bearer arms to the support bracket.

In operation, the device is actuated with the bowl 5 in the rearward position as shown in Figure 1 until sufficient load is obtained therein whereupon the piston and cylinder assembly 8 is actuated thus causing the piston rod 29 to move forwardly traversing the arc 40. As this occurs the cylinder will pivot on its trunnions 13 thus maintaining the optimum angle of attack with the rear surface of the bowl.

During forward movement of the piston rod, the thrust thereof is transferred via the trolley 21 to the track 17 and hence to the bowl 5 thus causing the bowl to pivot on its pins 7 to take up the position shown in fragment in Figure 1, the wheels 23 running upon the flange 22 of the track 17.

When the piston rod 29 is retracted, the relatively small wheels 25 engage upon the underside 27 of the flange 22 thus pulling the bowl back to its original position in readiness for the next load.

It will also be appreciated that when the piston rod is in its foremost position, it is supported by means of the bearer arms 35 which prevents distortion of the piston rod in case of stones or other foreign material getting between the wheels of the trolley and the track. Furthermore due to the bearer arms engaging the block 28, the piston rod is prevented from rotating axially thus relieving side strain on the trolley 21.

In conclusion, due to the pivotal or rocking action of the cylinder within the bearing blocks 13, the best possible angle of attack is maintained with the rear of the bowl 5 during the forward stroke thus permitting a lower pressure to be utilized within the piston and cylinder assembly yet at the same time enabling the same load to be dumped.

It is of course preferable that the pivotal support of the cylinder within bearing block 12 be as far forward along the length of the cylinder as is consistent with working clearances at the rear end of the cylinder and the framework or the ground upon which the device is being utilized.

Since various modifications can be made in my invention as hereinabove described, and many apparently widely different embodiments of same made within the spirit and scope of the claim without departing from such spirit and scope, it is intended that all matter contained in the accompanying specification shall be interpreted as illustrative only and not in a limiting sense.

What I claim as my invention is:

In a scraper of the type described, the combination of a frame, a forwardly tiltable bowl pivoted to said frame, a hydraulic cylinder disposed rearwardly of said bowl [a pair of trunnions provided intermediate the ends of said cylinder] *trunnion means on said cylinder* and pivotally attaching the same to said frame for swinging movement in a vertical plane, a track provided on said bowl in the plane of swinging of said cylinder, said cylinder having a reciprocable piston rod projecting forwardly therefrom, a carriage movable on said track, a pivot pin connecting the forward end of said piston rod to said carriage, and a pair of guide arms pivoted at one end thereof in transversely spaced relation to said frame, said guide arms being swingable in vertical planes and being pivoted at their other end to opposite sides of said carriage by said pivot pin whereby to guide the carriage in an arcuate path during its movement on said track when said piston rod is reciprocated.

References Cited in the file of this patent or the original patent

UNITED STATES PATENTS

| | | |
|---|---|---|
| 1,822,051 | Lytle | Sept. 8, 1931 |
| 2,204,033 | Austin | June 11, 1940 |
| 2,458,274 | Kadz | Jan. 4, 1949 |
| 2,514,053 | Gurries et al. | July 4, 1950 |
| 2,650,440 | Quartullo | Sept. 1, 1953 |
| 2,677,202 | Gustafson | May 4, 1954 |
| 2,773,320 | Fryer et al. | Dec. 11, 1956 |